(12) United States Patent
Tsuchihashi et al.

(10) Patent No.: US 9,851,757 B2
(45) Date of Patent: Dec. 26, 2017

(54) STAND ASSEMBLY FOR A PORTABLE ELECTRONIC DEVICE

(71) Applicant: LENOVO (SINGAPORE) PTE. LTD., Singapore (SG)

(72) Inventors: Moriyuki Tsuchihashi, Kanagawa-ken (JP); Seita Horikoshi, Kanagawa-ken (JP); Takehito Yamauchi, Kanagawa-ken (JP); Masayuki Amano, Kanagawa-ken (JP); Ryota Nohara, Kanagawa-ken (JP)

(73) Assignee: LENOVO (SINGAPORE) PTD LTE, Singapore (SG)

( * ) Notice: Subject to any disclaimer, the term of this patent is extended or adjusted under 35 U.S.C. 154(b) by 0 days.

(21) Appl. No.: 15/204,811

(22) Filed: Jul. 7, 2016

(65) Prior Publication Data

US 2017/0010629 A1     Jan. 12, 2017

(30) Foreign Application Priority Data

Jul. 7, 2015   (JP) ................................ 2015-136400

(51) Int. Cl.
  *G06F 1/16*       (2006.01)
(52) U.S. Cl.
  CPC ............ *G06F 1/166* (2013.01); *G06F 1/1626* (2013.01); *G06F 1/1671* (2013.01); *G06F 1/1681* (2013.01)
(58) Field of Classification Search
  CPC combination set(s) only.
  See application file for complete search history.

(56) References Cited

U.S. PATENT DOCUMENTS

| 4,951,241 | A | * | 8/1990 | Hosoi | ........................ B41J 3/36 361/679.09 |
| 5,235,495 | A | * | 8/1993 | Blair | ...................... F16M 11/10 16/445 |
| 5,375,076 | A | * | 12/1994 | Goodrich | .............. G06F 1/1626 361/679.17 |
| 6,016,248 | A | * | 1/2000 | Anzai | ................... G06F 1/1626 248/463 |
| 6,651,943 | B2 | * | 11/2003 | Cho | ..................... F16M 11/105 248/122.1 |
| 6,781,824 | B2 | * | 8/2004 | Krieger | ................. G06F 1/1626 16/224 |
| 7,295,429 | B2 | * | 11/2007 | Jackson, Jr. | .............. G06F 1/16 361/679.27 |
| 7,859,853 | B2 | * | 12/2010 | Schmeisser | ........... G06F 1/1626 361/752 |

(Continued)

FOREIGN PATENT DOCUMENTS

JP       2009-158669 A      7/2009

*Primary Examiner* — Lisa Lea Edmonds
(74) *Attorney, Agent, or Firm* — Russell Ng PLLC; Antony P. Ng

(57) ABSTRACT

A stand assembly for a portable electronic device is disclosed. The stand assembly enables the portable electronic device to stand horizontally and vertically, as well as standing at an angle. The stand assembly includes a first arm swingably provided by a first hinge on a rear surface side of a chassis, a second arm swingably provided by a second hinge on the rear surface side of the chassis. The stand assembly also includes a connecting section that connects the first arm to the second arm 12, with the second arm being longer than the first arm.

14 Claims, 8 Drawing Sheets

(56) References Cited

U.S. PATENT DOCUMENTS

| | | | | |
|---|---|---|---|---|
| 7,898,796 B2* | 3/2011 | Horie | G06F 1/16 | 361/679.02 |
| 8,031,463 B2* | 10/2011 | Yukawa | G06F 1/1615 | 313/582 |
| 8,162,282 B2* | 4/2012 | Hu | F16M 11/041 | 248/447 |
| 8,201,687 B2* | 6/2012 | Zeliff | G06F 1/1626 | 206/320 |
| 8,274,784 B2* | 9/2012 | Franz | F16M 11/10 | 248/634 |
| 8,400,767 B2* | 3/2013 | Yeom | F16M 11/10 | 248/917 |
| 8,514,557 B2* | 8/2013 | Li | F16M 11/10 | 16/221 |
| 8,567,748 B2* | 10/2013 | Zhou | F16M 11/10 | 248/676 |
| 8,649,166 B2* | 2/2014 | Wu | G06F 1/1601 | 361/679.27 |
| 8,807,333 B1* | 8/2014 | Cooper | A45C 11/00 | 206/320 |
| 8,879,250 B2* | 11/2014 | Franz | F16M 11/10 | 345/211 |
| 8,888,063 B2* | 11/2014 | Mack | F16M 11/00 | 248/121 |
| 8,902,575 B2* | 12/2014 | Zhou | F16M 11/041 | 248/127 |
| 9,250,652 B2* | 2/2016 | London | G06F 1/163 | |
| 9,451,818 B2* | 9/2016 | Buechin | A45C 11/00 | |
| 9,501,108 B2* | 11/2016 | Lee | G06F 1/1601 | |
| 2006/0028791 A1* | 2/2006 | Huang | G06F 1/1601 | 361/679.08 |
| 2006/0049327 A1* | 3/2006 | Chen | F16M 11/105 | 248/371 |
| 2006/0082957 A1* | 4/2006 | Chen | G06F 1/1601 | 361/679.21 |
| 2007/0075208 A1* | 4/2007 | Chen | F16M 11/10 | 248/455 |
| 2011/0240830 A1* | 10/2011 | Alemozafar | F16M 13/00 | 248/689 |
| 2013/0075280 A1* | 3/2013 | Besner | G06F 1/1626 | 206/45.23 |
| 2013/0079066 A1* | 3/2013 | Chan | H04M 1/04 | 455/575.1 |
| 2015/0346777 A1* | 12/2015 | Hosoya | F16M 11/38 | 361/679.56 |

\* cited by examiner

US 9,851,757 B2

STAND ASSEMBLY FOR A PORTABLE ELECTRONIC DEVICE

PRIORITY CLAIM

The present application claims benefit of priority under 35 U.S.C. §§120, 365 to the previously filed Japanese Patent Application No. JP2015-138400 with a priority date of Jul. 7, 2015, which is incorporated by reference herein.

BACKGROUND OF THE INVENTION

1. Technical Field

The present invention relates to portable electronic devices in general, and particularly to a stand assembly for supporting a portable electronic device.

2. Description of Related Art

In recent years, a tablet personal computer (tablet PC) that has a touch-screen liquid crystal display rather than a physical keyboard has been rapidly coming into widespread use. Typically, a tablet PC is operated either by being held by a hand or operated by being placed on a desk or the like. When operated on a desk or the like, the tablet PC is used in a standing position by using a stand in some cases.

For example, a tablet PC may have hinges provided on the rear surface side of the tablet PC, and a stand assembly provided rotatably about the hinges. The stand assembly is constituted of two arms, which are connected to the hinges and which have the same length, and a connecting section that connects the two arms.

The tablet PC, is sometimes used by being placed, standing horizontally or vertically on a stand. For example, a long side of the chassis of the tablet PC is brought into contact with a placement surface and the stand assembly is swung on the hinges so as to bring the connecting section into contact with the placement surface, thus enabling the tablet PC to horizontally stand. Further, the tablet PC can be set to horizontally stand at a desired angle by adjusting the swing angle of the stand assembly.

Meanwhile, the tablet PC can be set to vertically stand by bringing a short side of the chassis of the tablet PC into contact with the placement surface and also bringing the distal end of an arm into contact with the placement surface, the distal end acting as the supporting point. However, when the tablet PC is set to vertically stand as described above, it has been difficult to stably stand the tablet PC at an angle with respect to a direction that is orthogonal to the placement surface.

Consequently, it would be desirable to provide an improved stand assembly that selectively stands a tablet PC.

SUMMARY OF THE INVENTION

In accordance with a preferred embodiment of the present invention, a stand assembly includes a first arm, a second arm and a connecting section. The first arm swingably hinges to a rear surface of a chassis of a portable electronic device. The second arm swingably hinges to the rear surface of the chassis of the portable electronic device. The second arm is longer than the first arm. The connecting section connects the first arm to the second arm.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
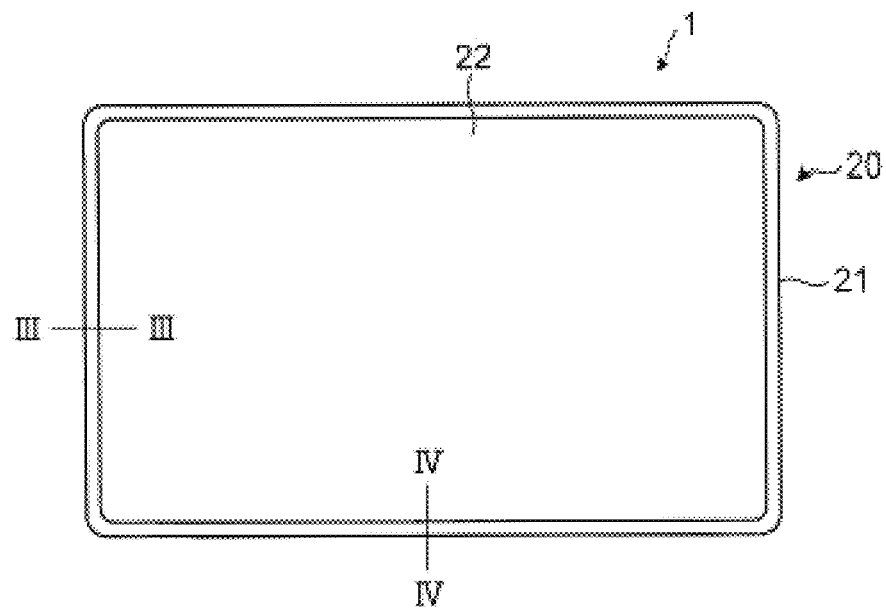
FIGS. 1A-1B are plan views of an electronic apparatus observed from the front side and rear side, respectively, in accordance with a preferred embodiment of the present invention.
Figure 1B:
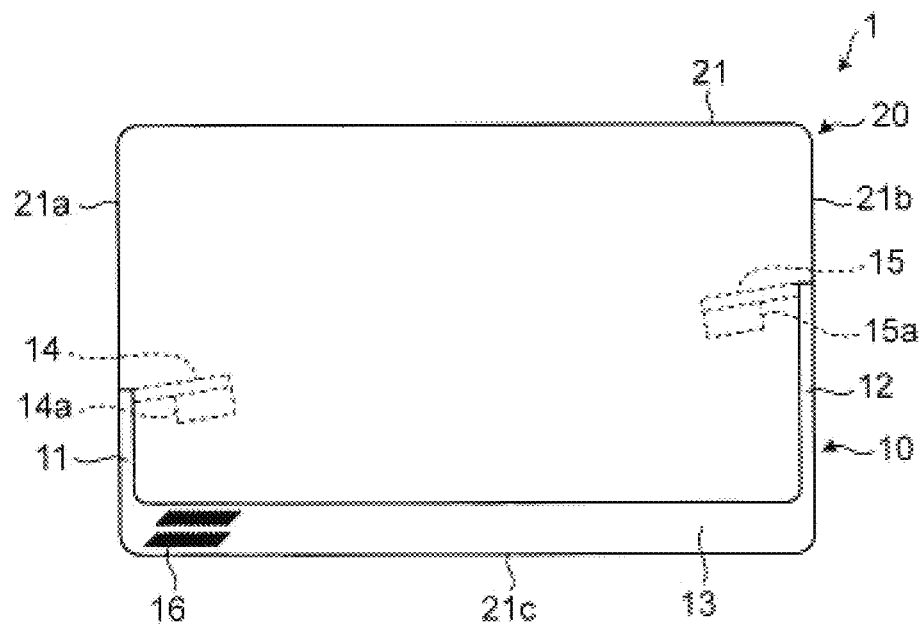
Figure 2A:
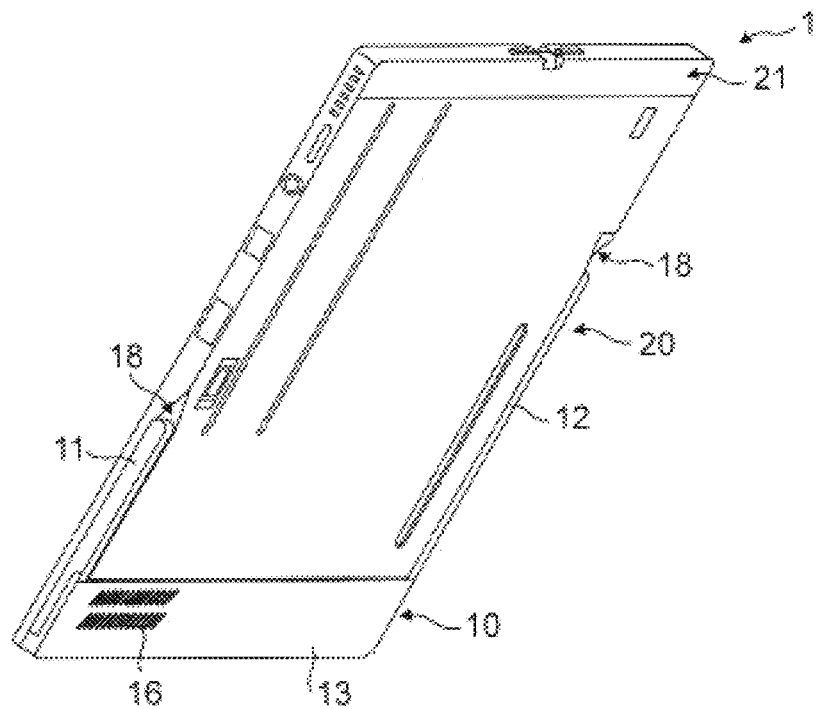
FIGS. 2A-2B are perspective views illustrating a stand assembly of the electronic apparatus from FIG. 1B in a folded and opened position, respectively.
Figure 2B:
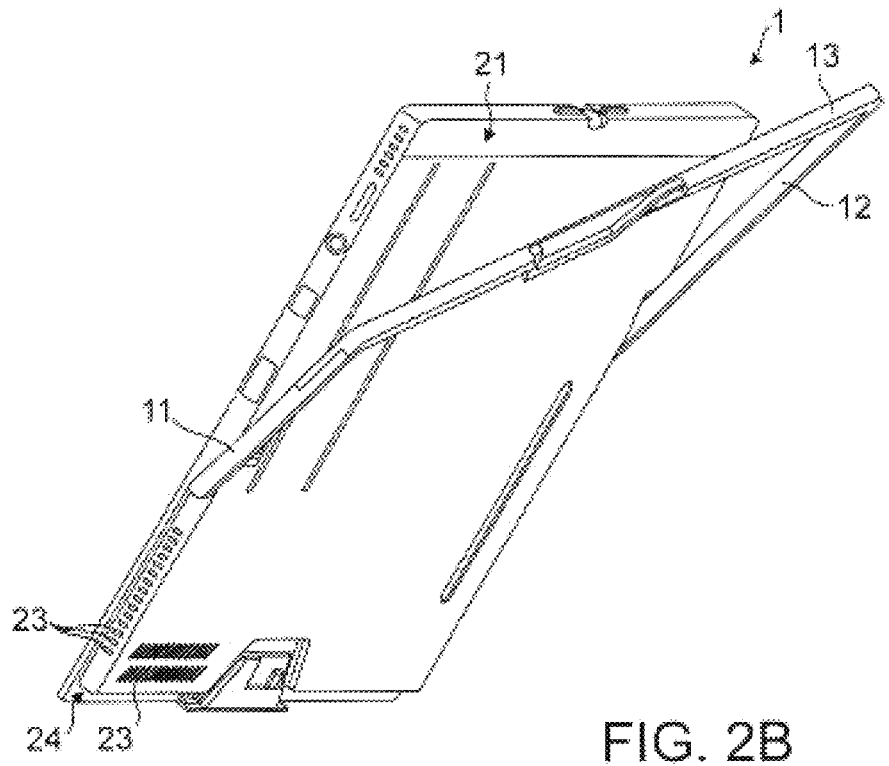

Referring now to the drawings and in particular to FIGS. 1A-1B, there are depicted plan views of an electronic apparatus, in accordance with a preferred embodiment of the present invention, FIG. 1A is a plan view of the electronic apparatus 1 observed from the front side, and FIG. 1B is a plan view of the electronic apparatus 1 observed from the rear side. FIG. 2 presents the perspective views of the electronic apparatus 1 according to the embodiment of the present invention, which is observed from the rear side. FIG. 2A is a perspective view illustrating a stand assembly 10 of the electronic apparatus 1, the stand assembly 10 having been folded, and FIG. 2B is a perspective view illustrating the stand assembly 10 of the electronic apparatus 1, the stand assembly 10 having been swung.

As illustrated in FIGS. 1 and 2, the electronic apparatus 1 has a portable information device 20 and the stand assembly 30 attached to the rear surface side of the portable information device 20. The portable information device 20 has a plate-shaped chassis 21 and a liquid crystal display (LCD) 22 provided on the from surface. The chassis 21 accommodates therein a substrate, an arithmetic unit, memories, a battery and the like. In the present embodiment, a description will be given of a tablet PC as an example of the portable information device 20. The portable information device 20 in the present invention, however, is not limited to the tablet PC and may be a smart phone or the like.

According to the present embodiment, the portable information device 20 has one of rectangular external shapes having different horizontal to vertical ratios. The stand assembly 10 enables a user to selectively stand the portable information device 20 horizontally or vertically at a desired angle. As the portable information device 20, a publicly known portable information device can be used, the external shape of which (the LCD display) has a horizontal to vertical ratio set to, for example, 16:9 or 4:3. Further, the LCD display 22 is a liquid crystal display unit that permits touch interactions.

The chassis 21 is substantially rectangular, as observed in a plan view. The chassis 21 has vents 23 for releasing the heal generated from an arithmetic unit, a battery, and the like. Further, an accommodating groove 24 for accommodating the stand assembly 10 is formed in the outer periphery of the chassis 21.

The stand assembly 10 has a first arm 11 extending in one direction, a second arm 12, which is longer than the first arm 11, and a connecting section 13, which connects the first arm 11 and the second arm 12. The first arm 11 and the second arm 12 are swingably provided at the rear surface of the chassis 21 by hinges 14 and 15, respectively. More specifically, the first arm 11 is connected to the hinge 14 mounted inside the chassis 21, and the second arm 12 is connected to the hinge 15. Further, the connecting section 13 connects the distal ends of the first arm 11 and the second arm 12. These hinges 14 and 15 are torque hinges.

As illustrated in FIG. 1B, the first arm 11, the second arm 12, and the connecting section 13 in the present embodiment are provided along the outer periphery of the chassis 21, and the first arm 11 and the second arm 12 are arranged to be parallel to each other. More specifically, the first arm 11 and the second arm 12 are disposed along short sides 21a and 21b, respectively, which oppose each other on the outer periphery of the chassis 21, and the connecting section 13 is disposed along one long side 21c of the long sides of the outer periphery of the chassis 21.

At least one of the first arm 11, the second arm 12, and the connecting section 13 is provided with openings 16, which are in communication with the vents 23 of the portable information device 20 (the chassis 21). In the present embodiment, the openings 16 are provided in the connecting section 13. The openings 16 are configured such that the openings 16 communicate with the vents 23 of the portable information device 20 when the stand assembly 10 is folded, thus allowing the heat generated from the portable information device 20 to be efficiently released with air.

Figure 3:
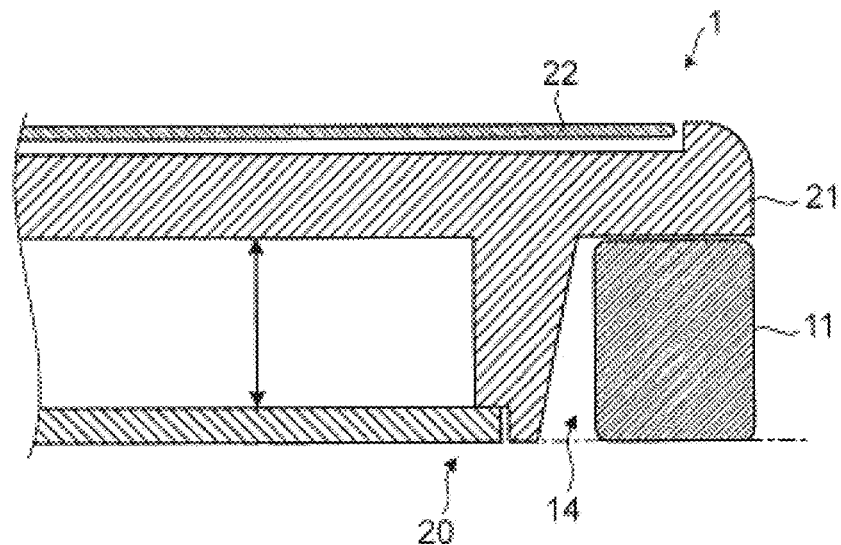
FIG. 3 is a sectional view of the electronic apparatus taken along III-III in FIG. 1A.
Figure 4:
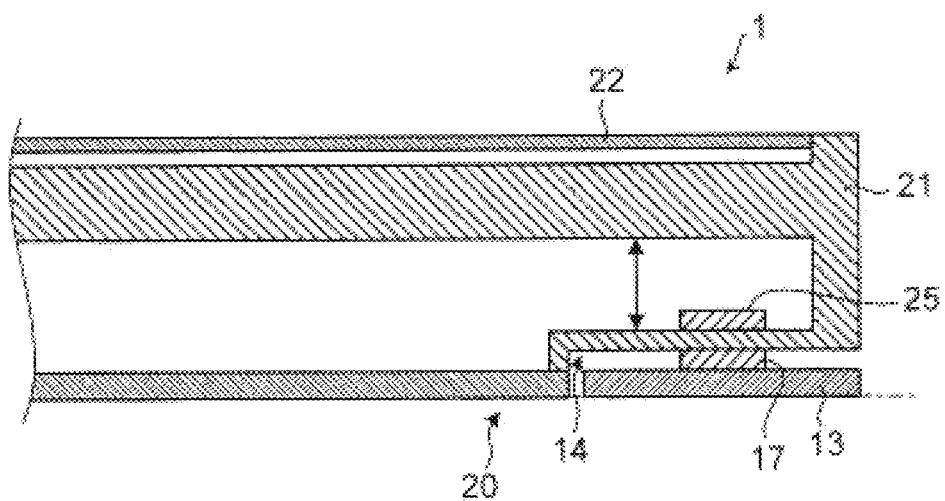
FIG. 4 is a sectional view of the electronic apparatus taken along IV-IV in FIG. 1A.

FIG. 3 is a sectional view of the electronic apparatus 1 taken along line III-III in FIG. 1A. FIG. 4 is a sectional view of the electronic apparatus 1 taken along line IV-IV in FIG. 1A. As illustrated in FIG. 3, the section of the first arm 11 in the present embodiment has a substantially rectangular shape. Further, the first arm 11 is disposed at the outer peripheral edge of the chassis 21, thus allowing the chassis 21 to provide an ample accommodating space. As with the first arm 11, the second arm 12 is also disposed at the outer peripheral edge of the chassis 21, thus providing an ample space for accommodating components in the chassis 21. This permits a higher degree of freedom for designing the layout of large components, such as a battery. Further, the rear surface side of the electronic apparatus 1 becomes flush with the stand assembly 10 to form a smooth rear surface when the stand assembly 10 is folded.

Further, according to the present embodiment, the connecting section 13 is formed to be thin and wide, as illustrated in FIG. 4. The small thickness of the connecting section 13 makes it possible to provide an ample space for accommodating components in the chassis 21 that overlap with the connecting section 13 in the thickness direction, so that components can be arranged in the chassis 21 even at an area overlapping with the correcting section 13. In addition, the large width of the connecting section 13 makes it possible to provide an actuate strength for the usage as the stand despite the thinness.

Further, according to the present embodiment, the connecting section 13 is provided with a magnet 17, whereas the chassis 21 is provided with a magnetically attracted part 25, which is attracted to the magnet 17. More specifically, the magnetically attracted part 25 is made of a magnetic material, such as a magnet or iron. Thus, the magnet 17 is provided on the connecting section 13 and the magnetically attracted part 25 is provided on the chassis 21, so that, when the stand assembly 10 is swung and folded into the accommodating groove 24, the stand assembly 10 can be easily folded in place by having the magnetically attracted part 25 attracted to the magnet 17. In this case, the stand assembly 10 can be folded in place even more smoothly by setting the torques of the hinges 14 and 15 to small values within a range in which the swing angle of the stand assembly 10 is small. Alternatively, the magnet 17 may be provided on the chassis 21 and the magnetically attracted part 25 may be provided on the connecting section 13. Further alternatively, one of the magnet 17 and the magnetically attracted part 25 may be provided on the first arm 11 or the second arm 12, and the other may be provided on the chassis 21.

Further, the axial directions of the rotations of the hinge 14 of the first arm 11 and the hinge 15 of the second arm 12 are on the same straight line. In other words, the axial directions of the rotations of the hinges 14 and 15 are on the line connecting the proximal ends of the first arm 11 and the second arm 12. The hinges 14 and 15 have fixing members 14a and 15a, respectively, for fixing the hinges 14 and 15 to the chassis 21. The fixing members 14a and 15a are secured to the chassis 21 by, for example, screws, so as to attach the hinges 14 and 15 to the chassis 21. The hinges 14 and 15 are torque hinges, and the torque of the hinge 15 of the second arm 12 is set to be larger than the torque of the hinges 14 of the first arm 11. This arrangement allows the loads applied to the hinges 14 and 15 of the first arm 11 and the second arm 12 to be further equalized when the connecting section 13 is held to swing the stand assembly 10 out through the hinges 14 and 15, thus making it possible to easily swing the stand assembly 10 and also to prevent the stand assembly 10 from being damaged.

Figure 5A:
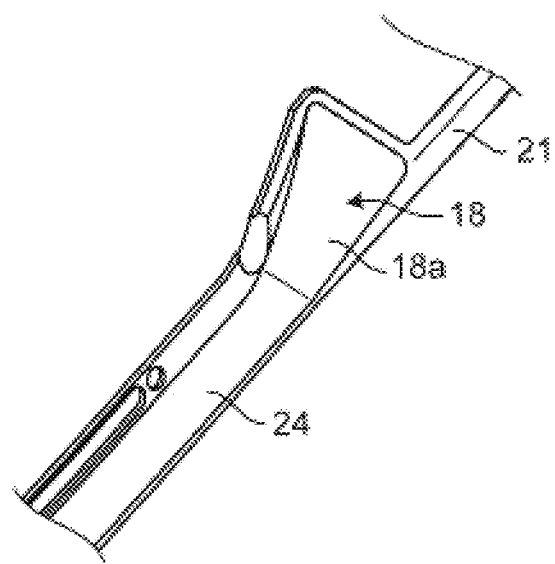
FIGS. 5A-5B are perspective and side views, respectively, of the regulating section of the electronic apparatus.
Figure 5B:
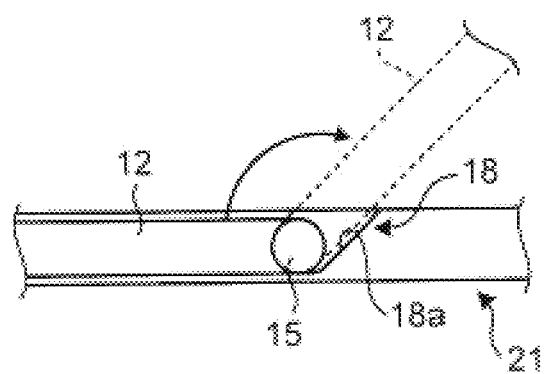

Further, the electronic apparatus 1 according to the present embodiment has regulating sections 18, which regulate the swing range of the first arm 11 and the second arm 12 of the stand assembly 10 (sec FIG. 2). FIGS. 5A-5B are diagrams illustrating one of the regulating sections 18 of the electronic apparatus 1 according to an embodiment of the present invention. FIG. 5A is a perspective view of the regulating section 18 of the electronic apparatus 1, and FIG. 5B is a side view of the regulating section 18 of the electronic apparatus 1. According to the present embodiment, the regulating sections 18 are provided each on the side surfaces of the chassis 21, as illustrated in FIG. 5A. FIG. 5B illustrates the regulating section 18 provided on the second arm 12 side.

Each of the regulating sections 18 has, on the side surface of the chassis 21, an inclined part 18a extending in a direction intersecting with the flat surface of the chassis 21. As illustrated in FIG. 5B, when the second arm 12 swings through the hinge 15, the second arm 12 swings until reaching the position of the inclined part 18a of the regulating section 18. Thus, the range of the swing of the second arm 12 is regulated. According to the present embodiment, the regulating sections 18 are provided on both the first arm 11 side and the second arm 12 side in the chassis 21.

However, providing the regulating section 18 on at least one of the first arm 11 and the second arm 12 makes it possible to regulate the swing range of the first arm 11 and the second arm 12.

Figure 6:
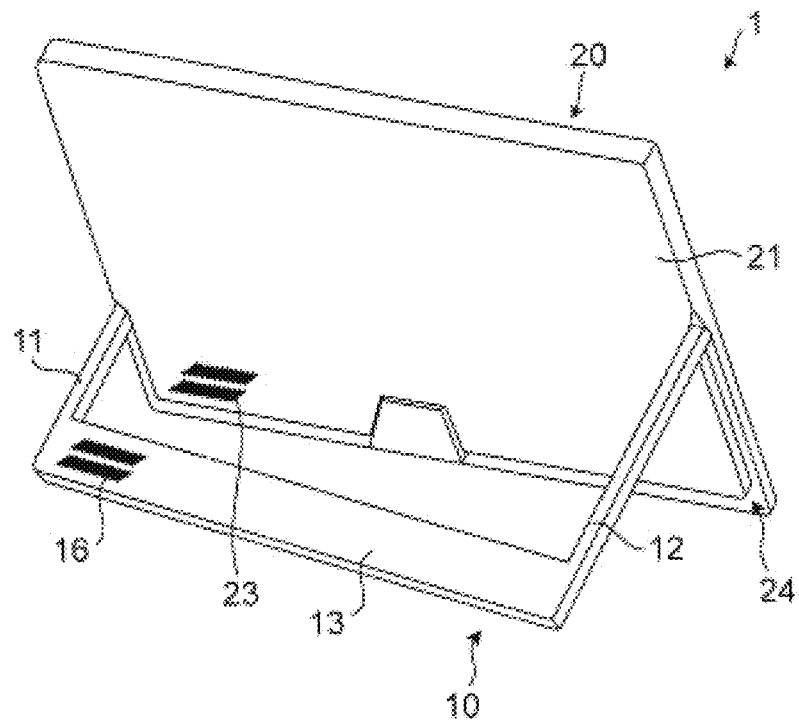
FIG. 6 is a diagram illustrating the electronic apparatus standing in a horizontal position.

A description will now be given of a method for selectively standing the electronic apparatus 1 horizontally or vertically by using the stand assembly 10 according to the embodiment of the present invention. First, the method for horizontally standing the electronic apparatus 1 will be described. FIG. 6 is a schematic diagram illustrating the electronic apparatus 1 according to the embodiment of the present invention that has been placed to horizontally stand, and FIG. 7 is a schematic side view illustrating the electronic apparatus 1 according to the embodiment of the present invention, which has been placed to stand horizontally.

From a state in which the stand assembly 10 is in the accommodating groove 24 of the chassis 21, the first arm 11 and the second arm 12 are swung through the hinges 14 and 15, respectively. Then, the long side of the outer periphery of the chassis 21 and the connecting section 13 of the stand assembly 10 are brought into contact with a placement surface, and the portable information device 20 (or the electronic apparatus 1) is placed to horizontally stand, as illustrated in FIG. 6. The torques of the hinges 14 and 15 of the stand assembly 10 are set at levels that are adequate to support the weight of the portable information device 20. The tilt angle for the portable information device 20 to horizontally stand can be adjusted by adjusting the swing angles of the first arm 11 and the second arm 12.

Figure 7:
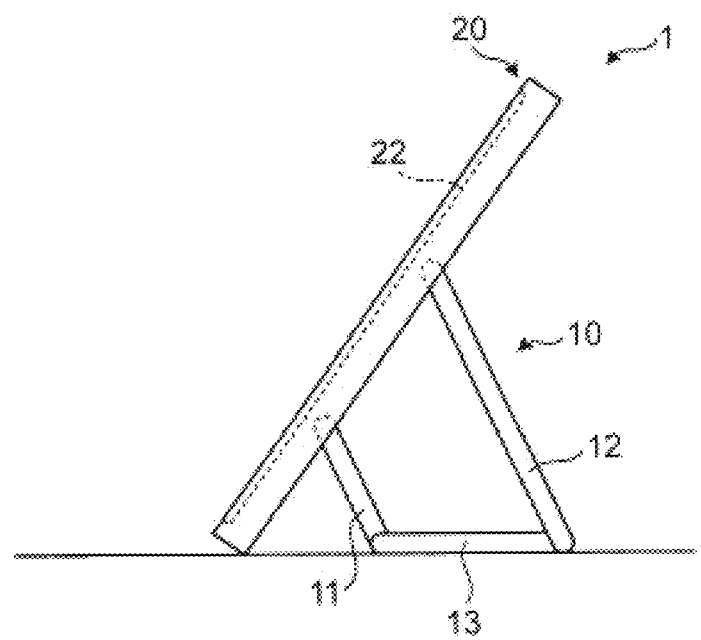
FIG. 7 is a side view illustrating the electronic apparatus standing in a horizontal position.

According to the present embodiment, when the electronic apparatus 1 is set to horizontally stand, the entire connecting section 13 will be brought into contact with the placement surface, as illustrated in FIG. 7, thereby enabling the electronic apparatus 1 to stably stand. The first arm 11, the second arm 12, and the connecting section 13 are arranged along the outer periphery of the chassis 21 of the portable information device 20, and the rotational axes of the hinges 14 and 15 are on the same straight line. With this arrangement, when the stand assembly 10 is swung, the angle formed by the first arm 11 and the chassis 21 of the portable information device 20 and the angle formed by the second arm 12 and the portable information device 20 become equal, as observed from a side surface (refer to FIG. 7), so that the entire connecting section 13 comes in contact with the placement surface, as previously described.

Figure 8:
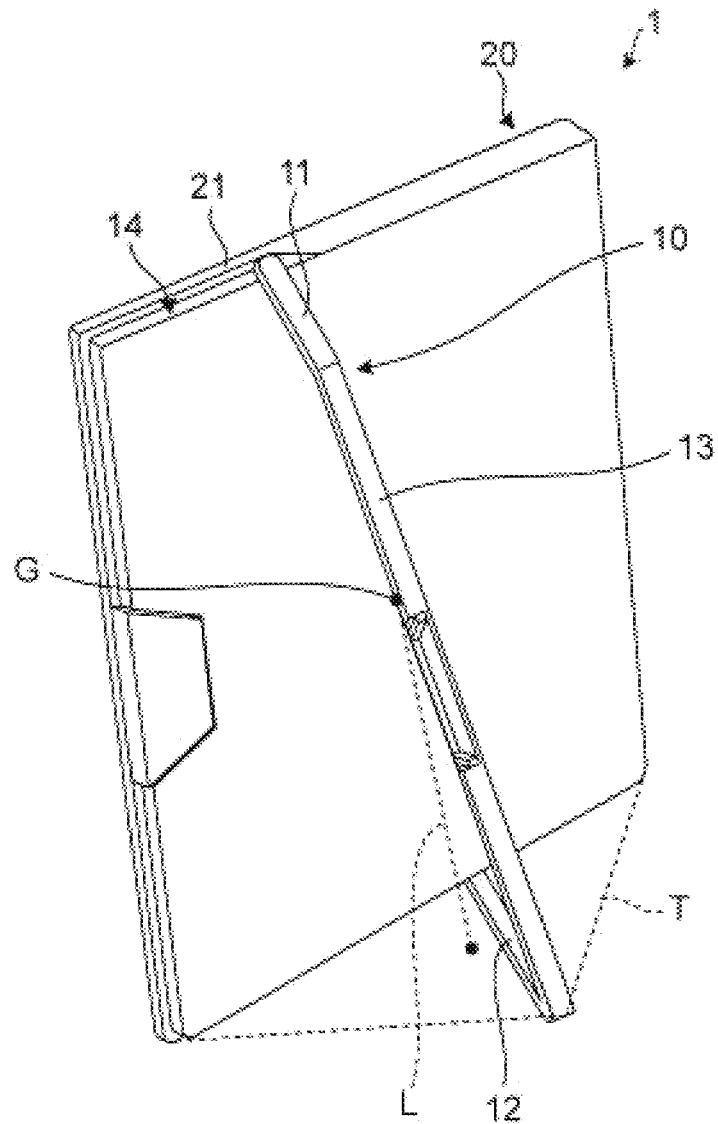
FIG. 8 is a diagram illustrating the electronic apparatus standing in a vertical position.
Figure 9:
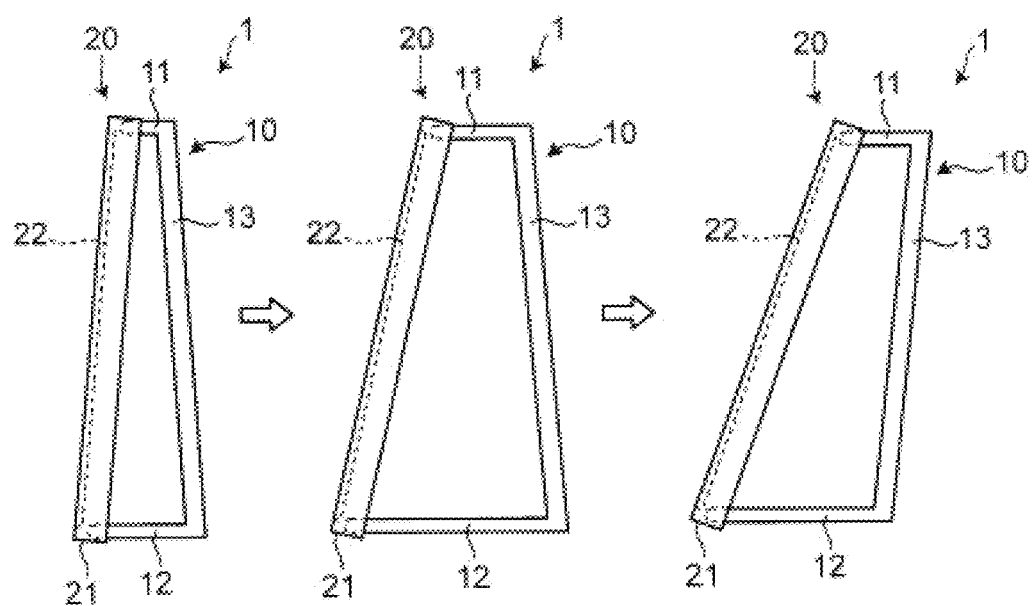
FIG. 9 is a side view illustrating the electronic apparatus standing in a vertical position.

A description will now be given of the method for vertically standing the portable information device 20 by using the stand assembly 10 according to the embodiment of the present invention. FIG. 8 is a schematic diagram illustrating the electronic apparatus S according to the embodiment of the present invention, which has been placed to vertically stand. FIG. 9 is a schematic side view illustrating live electronic apparatus 1 according to the embodiment of the present invention, which has been placed to vertically stand.

First, from a state in which the stand assembly 10 is in the accommodating groove 24 of the chassis 21, the first arm 11 and the second arm 12 are swung through the hinges 14 and 15, respectively. Then, the portable information device 20 is placed to vertically stand such that the short side 21b of the chassis 21 and the second arm 12 come in contact with the placement surface. The tilt angle of the portable information device 20 with respect to the placement surface can be adjusted by adjusting the swing angles of the first arm 11 and the second arm 12. More specifically, as illustrated in FIG. 9, the tilt of the portable information device 20 with respect to the direction orthogonal to the placement surface can be gradually increased by gradually increasing the swing angles of the first arm 11 and the second arm 12 from the state in which the stand assembly 10 is in the accommodating groove 24 of the chassis 21. The rightmost diagram of FIG. 9 illustrates a state in which the first arm 11 and the second arm 12 have been swung by 90 degrees or more.

In the case where the second arm 12 is brought into contact with the placement surface to vertically stand the portable information device 20 on the placement surface, a perpendicular line L from a center of gravity G of the portable information device 20 down to the placement surface preferably falls within a triangle T drawn by the contact line between the portable information device 20 and the placement surface and the distal end of the second arm 12. This enables the portable information device 20 to stand in a further stable state.

Figure 10:
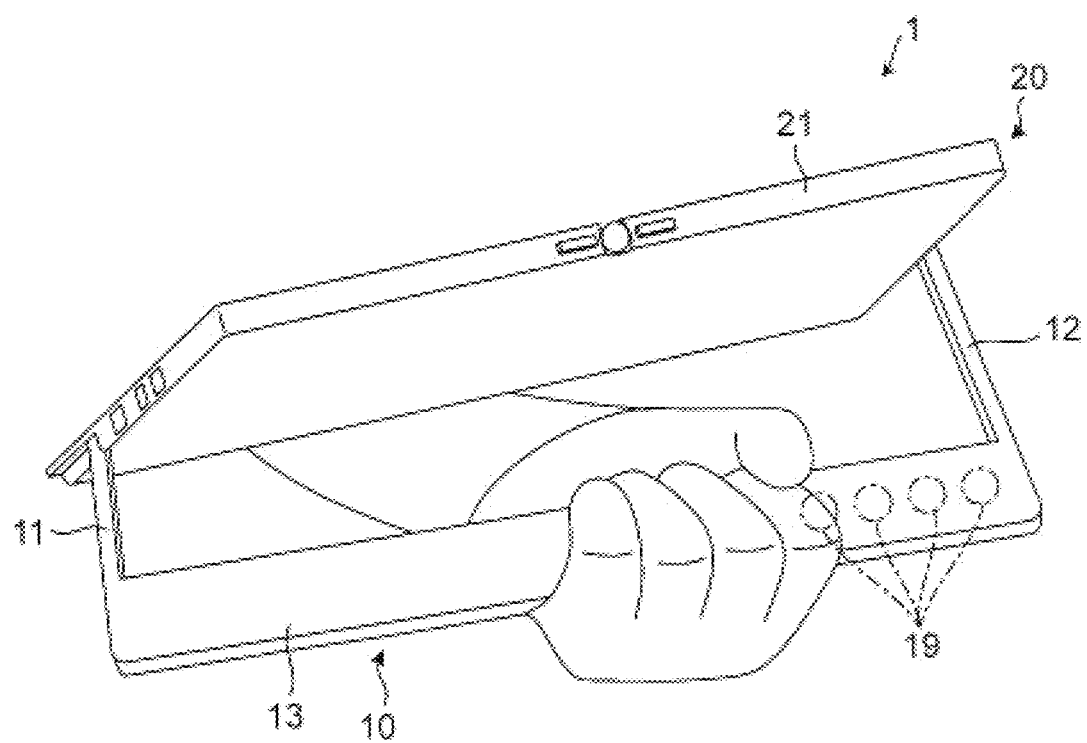
FIG. 10 is a diagram illustrating an example in which the electronic apparatus according to an embodiment of the present invention.

Further, the electronic apparatus 1 according to the embodiment of the present invention enables an operator to view the LCD screen of the portable information device 20 while holding the stand assembly 10 by one hand. FIG. 10 illustrates an example in which the operator is holding, by one hand, the electronic apparatus 1 according to the embodiment of the present invention. As illustrated in FIG. 10, for example, the operator can hold the connecting section 13 and place the outer periphery edge of the chassis 21 of the portable information device 20 on his or her arm to see the LCD display 22 of the portable information device 20 by holding the connecting section 13 of the stand assembly 10 with one hand. In this case, setting the swing angle of the stand assembly 10 to a range of up to, for example, 170 degrees by the regulating sections 18 makes it easy for the operator to hold the connecting section 13 by inserting his or her hand between the stand assembly 10 and the portable information device 20.

In this case, operation buttons 19 for operating the portable information device 20 may be disposed on the connecting section 13, as illustrated in FIG. 10. The operation buttons 19 are, for example, buttons for flicking the screen in an app of the portable information device 20. The electric wiring of the operation buttons 19 can be laid out, for example, via the inside of the hinges 14 and 15, the first arm 11, the second arm 12 and the connecting section 13 from inside the chassis 21. The foregoing operation buttons 19 provided on the connecting section 13 enable the operator holding the electronic apparatus 1 by one hand to push the operation buttons 19 with a finger of the hand holding the electronic apparatus 1 thereby to operate on the screen.

The electronic apparatus 1 and the stand assembly 10 according to the present embodiment configured as described above include the first arm 11 and the second arm 12, which is longer than the first arm 11, and the connecting section 13, which connects the first arm 11 and the second arm 12, the first arm 11 and the second arm 12 being swingably connected to the rear surface side of the chassis 21 by the hinges 14 and 15, respectively. The second arm 12, which is formed to be longer than the first arm 11, enables the portable information device 20 to more stably stand at an angle when the second arm 12 is brought into contact with a placement surface to vertically stand the portable information device 20, as compared with the case where the first arm 11 and the second arm 12 have the same length.

For example, in the case where a first arm, a second arm, and a connecting section are provided along the outer periphery of a chassis, if the first arm and the second MB have the same length, then a portable information device can be placed to stand only in a right-angle direction relative to a placement surface when the second arm is brought into contact with the placement surface to vertically stand the portable information device. Meanwhile, in the electronic apparatus 1 according to the present embodiment, although the first arm 11, the second arm 12, and the connecting section 13 are provided along the outer periphery of the chassis 21, the first arm 11 and the second arm 12 have different lengths, thus making it possible to vertically stand the portable information device 20 at an angle.

Obviously, the present invention is not limited to the embodiment described above and can be freely changed within a scope that does not deviate from the spirit of the present invention. For example, in the foregoing embodiment, the description has been given of the case where at least one of the first arm 11, the second arm 12, and the connecting section 13 is provided with the openings 16 for releasing the heat from the portable information device 20 and the operation buttons 19 for operating the portable information device 20 as the functions added to the stand function. Alternatively, other functional parts having functions other than the stand function may be provided.

Further, although the description has been given of the case where the first arm 11, the second arm 12, and the connecting section 13 are provided along the outer periphery of the chassis 21 in the foregoing embodiment, the present invention is not limited thereto. Alternatively, the first arm 11, the second arm 12, and the connecting section 13 may be provided inside the outer periphery of the chassis 21, as observed in a planar view.

As has been described, the present disclosure provides an improved stand assembly for selectively standing a tablet PC.

While the disclosure has been particularly shown and described with reference to a preferred embodiment, it will be understood by those skilled in the art that various changes in form and detail may be made therein without departing from the spirit and scope of the disclosure.

What is claimed is:

1. An apparatus comprising:
   a first arm swingably hinged to a rear surface of a chassis of a portable electronic device;
   a second arm swingably hinged to said rear surface of said chassis, wherein said second arm is longer than said first arm, wherein when said second arm is brought into contact with a placement surface to stand said portable electronic device on said placement surface, a perpendicular line from a center of gravity of said portable electronic device down to said placement surface falls within a triangle drawn by a contact line between said portable electronic device and said placement surface and a distal end of said second arm; and
   a connecting section connects said first arm and said second arm.

2. The apparatus of claim 1, wherein said first arm is connected to said chassis via a first hinge, and said second arm is connected to said chassis via a second hinge.

3. The apparatus of claim 2, wherein axial directions of rotations of said first hinge of said first arm and said second hinge of said second arm are on a same straight line.

4. The apparatus of claim 1, wherein said first arm, said second arm, and said connecting section are provided along an outer periphery of said chassis, wherein said first arm and said second arm are disposed in parallel to each other.

5. A portable electronic device comprising:
   a plate-shaped chassis; and
   a stand assembly having,
      a first arm swingably hinged to a rear surface of said chassis;
      a second arm swingably hinged to said rear surface of said chassis, wherein said second arm is longer than said first arm, wherein said first arm is connected to said chassis via a first hinge, and said second arm is connected to said chassis via a second hinge, wherein axial directions of rotations of said first hinge of said first arm and said second hinge of said second arm are on a same straight line; and
      a connecting section connects said first arm and said second arm.

6. The portable electronic device of claim 5, wherein said first arm, said second arm, and said connecting section are provided along an outer periphery of said chassis, wherein said first arm and said second arm are disposed in parallel to each other.

7. The portable electronic device of claim 5, wherein said chassis includes an accommodating groove for accommodating said stand assembly.

8. The portable electronic device of claim 5, wherein said chassis includes a regulating section that regulates a swingable range of one of said first and second arms.

9. The portable electronic device of claim 5, wherein a magnet is provided on at least one of said first arm, said second arm and said connecting section.

10. The portable electronic device of claim 5, wherein a magnet is provided on said chassis.

11. A portable electronic device comprising:
    a plate-shaped chassis; and
    a stand assembly having
       a first arm swingably hinged to a rear surface of said chassis;
       a second arm swingably hinged to said rear surface of said chassis, wherein said second arm is longer than said first arm, wherein when said second arm is brought into contact with a placement surface to stand said portable electronic device on said placement surface, a perpendicular line from a center of gravity of said portable electronic device down to said placement surface falls within a triangle drawn by a contact line between said portable electronic device and said placement surface and a distal end of said second arm; and
       a connecting section connects said first arm and said second arm.

12. The portable electronic device of claim 11, wherein said first arm is connected to said chassis via a first hinge, and said second arm, is connected to said chassis via a second hinge.

13. The portable electronic device of claim 12, wherein axial directions of rotations of said first hinge of said first arm and said second hinge of said second arm are on a same straight line.

14. The portable electronic device of claim 11, wherein said first arm, said second arm, and said connecting section are provided along an outer periphery of said chassis, wherein said first arm and said second arm are disposed in parallel to each other.

* * * * *